(12) United States Patent
Tiraspolsky et al.

(10) Patent No.: US 9,282,355 B2
(45) Date of Patent: Mar. 8, 2016

(54) DELAYED VIDEO-ON-DEMAND STREAMING FOR ENHANCED USER EXPERIENCE AND NETWORK CAPACITY OPTIMIZATION

(71) Applicant: Verizon Patent and Licensing Inc., Basking Ridge, NJ (US)

(72) Inventors: Alexander Tiraspolsky, Newton, MA (US); Lev Kaufman, Newton, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 10 days.

(21) Appl. No.: 14/270,594

(22) Filed: May 6, 2014

(65) Prior Publication Data

US 2015/0326901 A1 Nov. 12, 2015

(51) Int. Cl.
*H04N 21/262* (2011.01)
*H04N 21/2389* (2011.01)
*H04N 21/472* (2011.01)
*H04N 21/647* (2011.01)
*H04N 21/20* (2011.01)
*H04N 21/24* (2011.01)
*H04N 21/442* (2011.01)
*H04N 21/2385* (2011.01)

(52) U.S. Cl.
CPC ........... *H04N 21/2625* (2013.01); *H04N 21/20* (2013.01); *H04N 21/2385* (2013.01); *H04N 21/23895* (2013.01); *H04N 21/24* (2013.01); *H04N 21/2402* (2013.01); *H04N 21/44209* (2013.01); *H04N 21/47202* (2013.01); *H04N 21/647* (2013.01)

(58) Field of Classification Search
None
See application file for complete search history.

(56) References Cited

U.S. PATENT DOCUMENTS

| | | | |
|---|---|---|---|
| 2003/0005452 A1* | 1/2003 | Rodriguez | 725/86 |
| 2009/0007198 A1* | 1/2009 | Lavender et al. | 725/91 |
| 2012/0317655 A1* | 12/2012 | Zhang et al. | 726/28 |
| 2013/0044603 A1* | 2/2013 | Macias et al. | 370/241 |
| 2013/0167180 A1* | 6/2013 | Georgescu | 725/93 |

* cited by examiner

*Primary Examiner* — Justin Shepard

(57) ABSTRACT

A user device receives a video-on-demand (VOD) selection from a user and determines that current network streaming conditions are not adequate to provide high-quality VOD content. The user device presents an option, to the user, to delay presentation of the VOD content and receives a selection to delay presentation. Based on the selection to delay, the user device obtains the VOD content from a content delivery system and obtains encryption keys for the VOD content from a license server. In a manner transparent to the content delivery system, the user device stores the VOD content and encryption keys to create stored VOD content and stored encryption keys. The user device notifies the user that the VOD content is available to view and presents the stored VOD content using the stored encryption keys. The user device deletes the stored content and stored encryption keys per a VOD viewing policy.

20 Claims, 7 Drawing Sheets

DELAYED VIDEO-ON-DEMAND STREAMING FOR ENHANCED USER EXPERIENCE AND NETWORK CAPACITY OPTIMIZATION

BACKGROUND

Video-on-demand (VOD) is becoming an increasingly popular choice for customers of media service providers. VOD streaming services are typically based on unicast streaming techniques, which require that a video server or content delivery network stream media to each client device separately. Particularly, high definition VOD streaming requires guaranteed bandwidth and throughput on both the content delivery network (CDN) and a "last mile" network (e.g., the connection between a customer and a telephone company, cable company, and/or service provider). However, bandwidth limitations can hinder VOD streaming services when a large number of customers stream and watch VOD at the same time, such as during peak use hours. These conditions may prevent service providers from delivering a video stream of the best quality at the time a VOD program is requested.

DETAILED DESCRIPTION OF PREFERRED EMBODIMENTS

Figure 1:
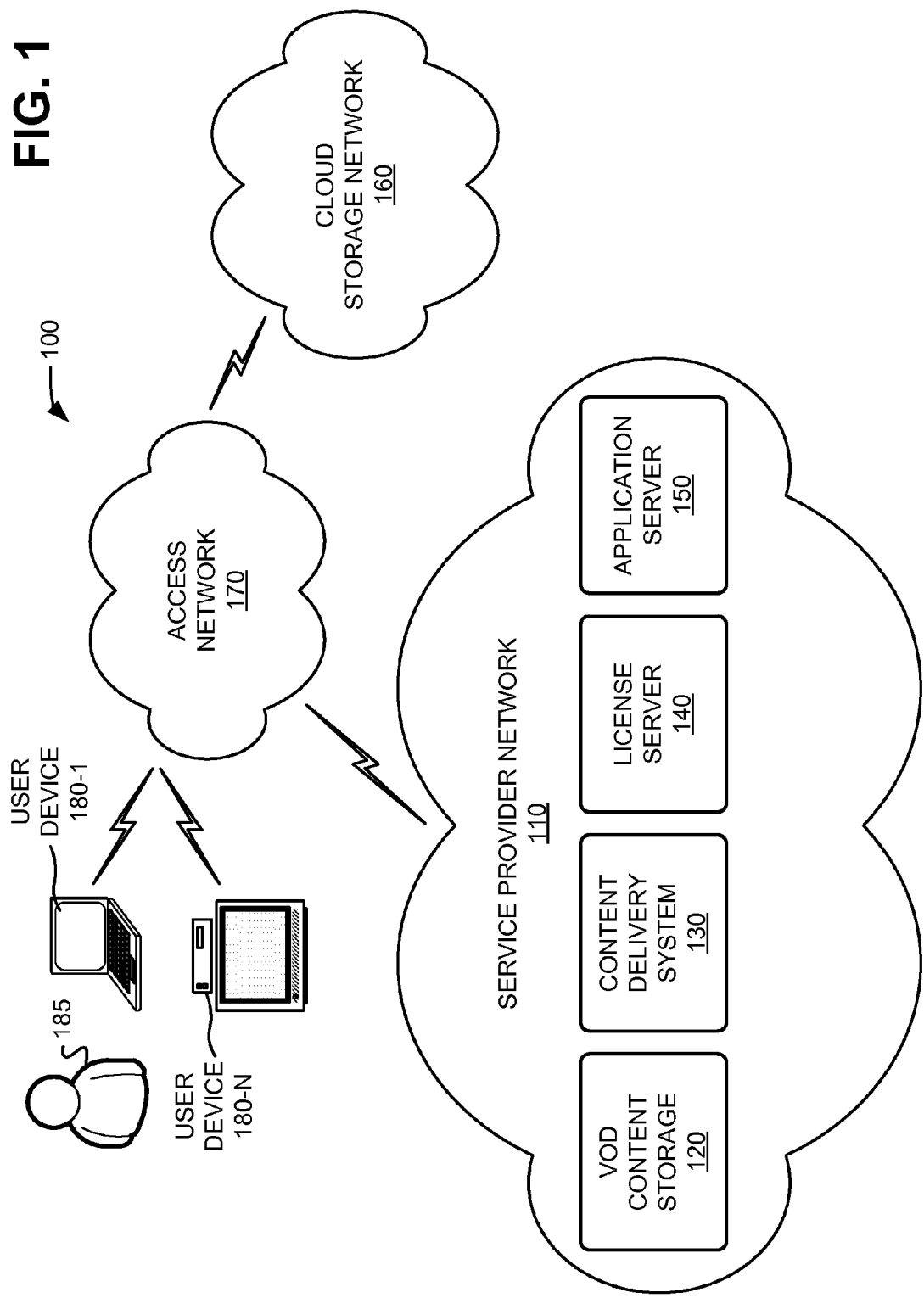
FIG. 1 is an exemplary network environment in which systems and/or methods described herein may be implemented.

The following detailed description refers to the accompanying drawings. The same reference numbers in different drawings may identify the same or similar elements.

Streaming is often preferred by service providers as a practical way to provide video-on-demand (VOD) programs to consumers while limiting unauthorized uses. With streaming video, a content file is typically not downloaded to the user's computer. Instead the video is seen only as a real-time stream and there is no file left on the user's device. However, network conditions and total demand for streaming may make it impossible for a service provider to deliver a requested video stream, of consistently high quality, at the time a viewer requests a VOD program. High quality video, as the term is used herein, may generally include any video content above standard definition, including enhanced definition video (such as 480p resolution) and high definition video (such as 720p and 1080p resolution or higher).

Some streaming services can detect a slow network connection and, as a result, will deliver reduced-quality video that use less bandwidth. The reduced-quality video make playback of a VOD program smoother, but diminish the detail of the on-screen presentation. With other streaming services, users may elect to receive only higher quality video. The higher quality video may cause excessive buffering and disrupt smooth playback of the VOD program when there is a slow network connection. In some instances a viewer may be willing to delay VOD viewing until a later time, if the viewer will be guaranteed that the best available quality (e.g., high definition, 3D, etc.) will be consistently provided during the VOD program presentation. In other instances, additional incentives (such as a discount or coupon) may provide added incentive for a viewer to delay the VOD viewing until a later time. Delayed viewing may provide a better viewing experience for the viewer and allow the service provider to control network traffic by shifting some heavy video traffic to off-peak hours.

According to implementations described herein, when a viewer (also referred to herein as a "user") agrees to delayed VOD playback or schedules VOD playback for a future time, the full VOD asset (e.g., program content) in the best quality can be delivered in a not-real-time mode (e.g., using off-peak traffic hours) and can be stored in a local cache of the user's requesting device with the same copyright protections (e.g., license/encryption keys) as the original VOD stream. Alternatively, a personal secure cloud can be configured to store the full VOD asset and license/encryption keys. Thus, systems and/or methods described herein may reduce overall network traffic during peak periods and ensure a high-quality VOD experience for individual viewers. Systems and methods described herein can accomplish these features via use of a client application on the end-user device, without requiring changes to service provider systems.

In one implementation, a user device may receive a VOD selection from a user and may determine that current network conditions are not adequate to provide streaming of high-quality VOD content associated with the VOD selection. The user device may present an option, to the user, to delay presentation of the VOD content and may receive a selection, from the user, of the option to delay presentation of the VOD content. The user device may obtain the VOD content from a content delivery system, obtain encryption keys for the VOD content from a license server, and store securely the VOD content and the encryption keys in a manner that is transparent to the content delivery system. The user device may notify the user that the VOD content is available to view after the VOD content and encryption keys have been stored, and may present the stored VOD content using the stored encryption keys. User device 180 can delete the stored VOD content and stored encryption keys, after presenting the delayed VOD session, per a VOD viewing rights policy.

FIG. 1 is an exemplary network environment 100 in which systems and/or methods described herein may be implemented. As illustrated, network environment 100 may include a service provider network 110, including VOD content 120, a content delivery system 130, and a license server 140; an application server 150; a cloud storage network 160; and access network 170; and user devices 180-1 through 180-N (collectively "user devices 180" and individually "user device 180") accessed by a user 185.

Service provider network 110 may provide, among other services, digital VOD content (e.g., from VOD content storage 120) available for streaming to user devices 180. For example, service provider network 110 may provide a service subscription that includes entitlements to access a particular library of media for streaming (e.g., provided from content delivery system 130). In one implementation, the library of streaming media may include a subset of a larger collection of content.

VOD content storage 120 may include any type or form of VOD content to provide to user devices 180 for distribution. For example, VOD content may include recorded content from free television broadcast providers (e.g., broadcast providers, such as NBC, CBS, ABC, and/or Fox) and for-pay television broadcast providers (e.g., TNT, ESPN, HBO, Cinemax, CNN, etc.) that permit content to be streamed and/or downloaded. VOD content may also include on-demand movie content from other content providers (e.g., video on demand (VOD) providers, pay per view (PPV) providers, etc.).

Content delivery system 130 may aggregate content and content metadata (e.g., from VOD content 120), process content, and distribute content to user devices 180. For example, content delivery system 130 may transcode content into a digital format suitable for consumption on particular user devices 180. In some implementations, content delivery system 130 may include a transcoder (hardware or software) to convert a video file from one format to another (e.g., from one bit rate to another bit rate, from one resolution to another, from one standard to another, etc.). Content delivery system 130 may also encrypt data.

According to implementations described herein, content delivery system 130 may divide streaming media into multiple media segments for delivery to user devices 180. For example a two-hour movie can be divided into 720 segments, with each segment containing about ten seconds of streaming content. Each segment may have at least a clear media frame, so that each segment can be played independently by user devices 180. The multiple segments can be buffered and/or reassembled by a video application (e.g., residing on user device 180) for a cohesive presentation. Content delivery system 130 may support any of a variety of streaming technologies, such as Apple's HTTP Live Streaming, Microsoft's Smooth Streaming, or other streaming technologies.

License server 140 may issue, validate, and/or enforce digital rights management (DRM) licenses to a client, such as an application running on one of user devices 180. In some implementations, license server 140 may determine entitlement rights and/or other authorization parameters via interfaces of application server 150. Such information may be used to authorize a user to access particular content (e.g., issue a license to user device 180), and control/limit the number of concurrent viewing sessions and/or downloads for the user.

Application server 150 may manage authentication, selection of content, authorization for streaming content, and/or purchase of content by users of user devices 180. Application server 150 may also link to other backend systems to support applications residing on user devices 180. For example, application server 150 may communicate with a customer profile and billing system to authenticate a user who desires to purchase, rent, or subscribe to digital content (e.g., available through content delivery system 130). In one implementation, application server 150 may initiate processing of discounts related to a viewer's opting to delay VOD streaming. Interactions between application server 150 and user devices 180 may be performed, for example, using hypertext transfer protocol (HTTP) or secure HTTP (HTTPS) via access network 170.

As described further herein, application server 150 may permit user devices 180 to download a client application to select VOD content and manage delayed VOD viewing. In one implementation, the client application may include proprietary software authorized by the service provider to locally manage delayed VOD streaming on registered user devices 180. Once user device 180 is registered via application server 150, the downloaded client application may enable user device 180 to present, in an interactive format to a user of user device 180, information (e.g., VOD content options) received from service provider network 110, and to allow selection of particular VOD content. Furthermore, the client application may allow user device 180 to monitor network congestion status (e.g., of service provider network 110 and access network 170) and provide delayed VOD viewing options to the user.

Cloud storage network 160 may include one or more network devices to provide personal file storage (e.g., associated with a particular user account) that is accessible exclusively and securely by user device 180. In one implementation, cloud storage network 160 may include network connectivity that is exclusive to a particular service provider and can provide a guaranteed connection bitrate to user device 180.

Access network 170 may include a local area network (LAN), a wide area network (WAN), such as a cellular network, a satellite network, a fiber optic network, a private WAN, the public switched telephone network (PSTN), or a combination of the Internet and a private WAN, etc., that is used to transport data. Although shown as a single element in FIG. 1, access network 170 may include a number of separate networks that function to provide services to user devices 180.

User device 180 may include a computational or communication device that is capable of communicating via access network 170. User device 180 may enable a user to communicate with other devices to select, receive, and present video content (e.g., VOD content) to a user. User device 180 may include, for example, a set-top box (STB), a home media server, a smart phone, a tablet computer, a personal computer, a laptop computer, a gaming console, an Internet television, or other types of computation or communication devices.

In one implementation, user device 180 may include a client application that enables user device 180 to communicate with, for example, content delivery system 130, license server 140, and/or application server 150. The client application may permit a user of user device 180 to login to an account, access catalog information, submit an order for content to view, receive streaming content, and/or manage delayed viewing of streaming content. In one implementation, user device 180 may also include a local memory that may be configured to buffer extended portions or complete programs of VOD content. According to an implementation described herein, user device 180 may monitor network congestion status (e.g., of service provider network 110 and access network 170) at the time of a VOD content request and provide delayed VOD viewing options to the user, when applicable. The client application on user device 180 may enable the user device to stream video content during off-peak periods and provide delayed VOD viewing without receiving additional content from the content delivery system.

In FIG. 1, the particular arrangement and number of components of network environment 100 are illustrated for simplicity. In practice there may be more service provider networks 110, VOD content storage 120, content delivery systems 130, license servers 140, application servers 150, cloud storage networks 160, access networks 170, and/or user devices 180. Components of network environment 100 may be connected via wired and/or wireless links.

Figure 2:
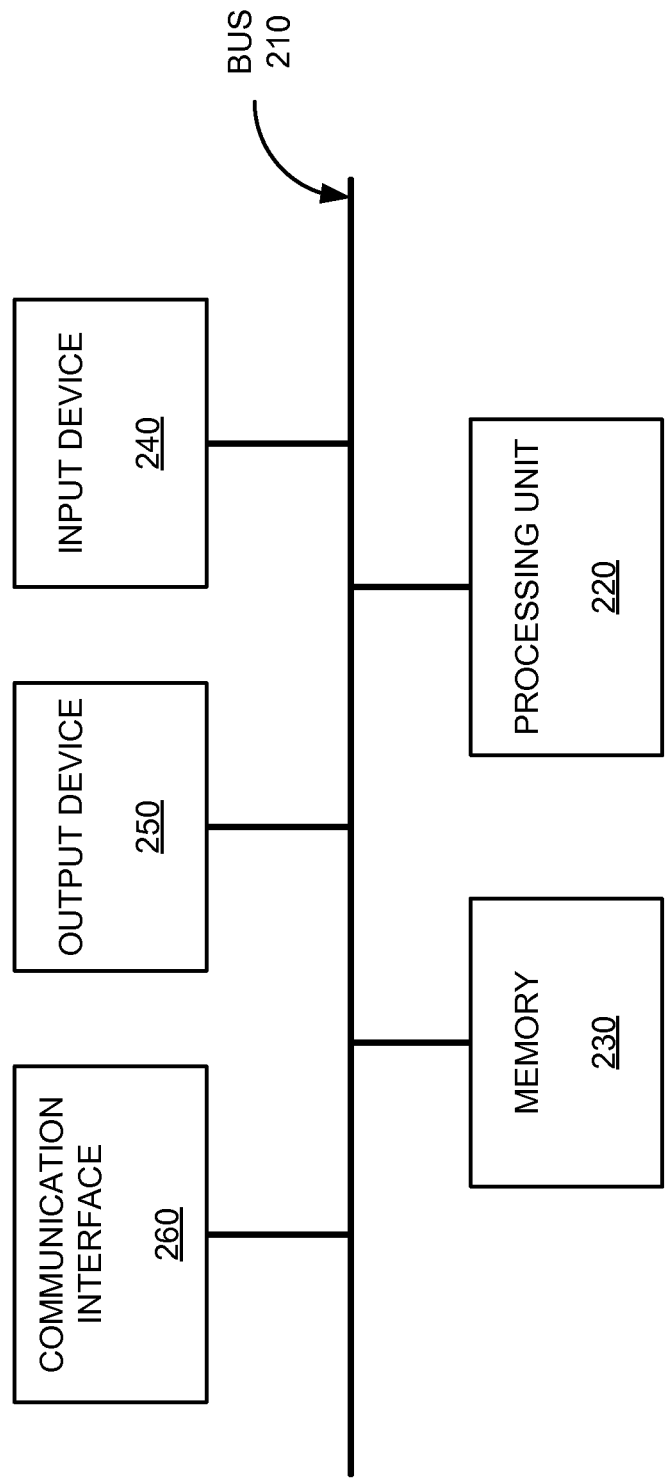
FIG. 2 is a block diagram of exemplary components of a device that may correspond to one of the devices of FIG. 1.

FIG. 2 is a diagram of exemplary components of a device 200. Each of content delivery system 130, license server 140, application server 150, and user device 180 may be implemented/installed as software, hardware, or a combination of hardware and software, on its respective device 200. In one implementation, device 200 may be configured as a network device. In another implementation, device 200 may be configured as a computing device. In still another implementation, device 200 may be configured as part of an STB or media server. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a remote controle, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices in network environment 100. Each of such other devices of network environment 100 may include its respective communication interface 260 to achieve such communication.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, a display may not be included in device 200. Alternatively, or additionally, one or more components of device 200 may perform one or more other tasks described as being performed by one or more other components of device 200.

Figure 3:
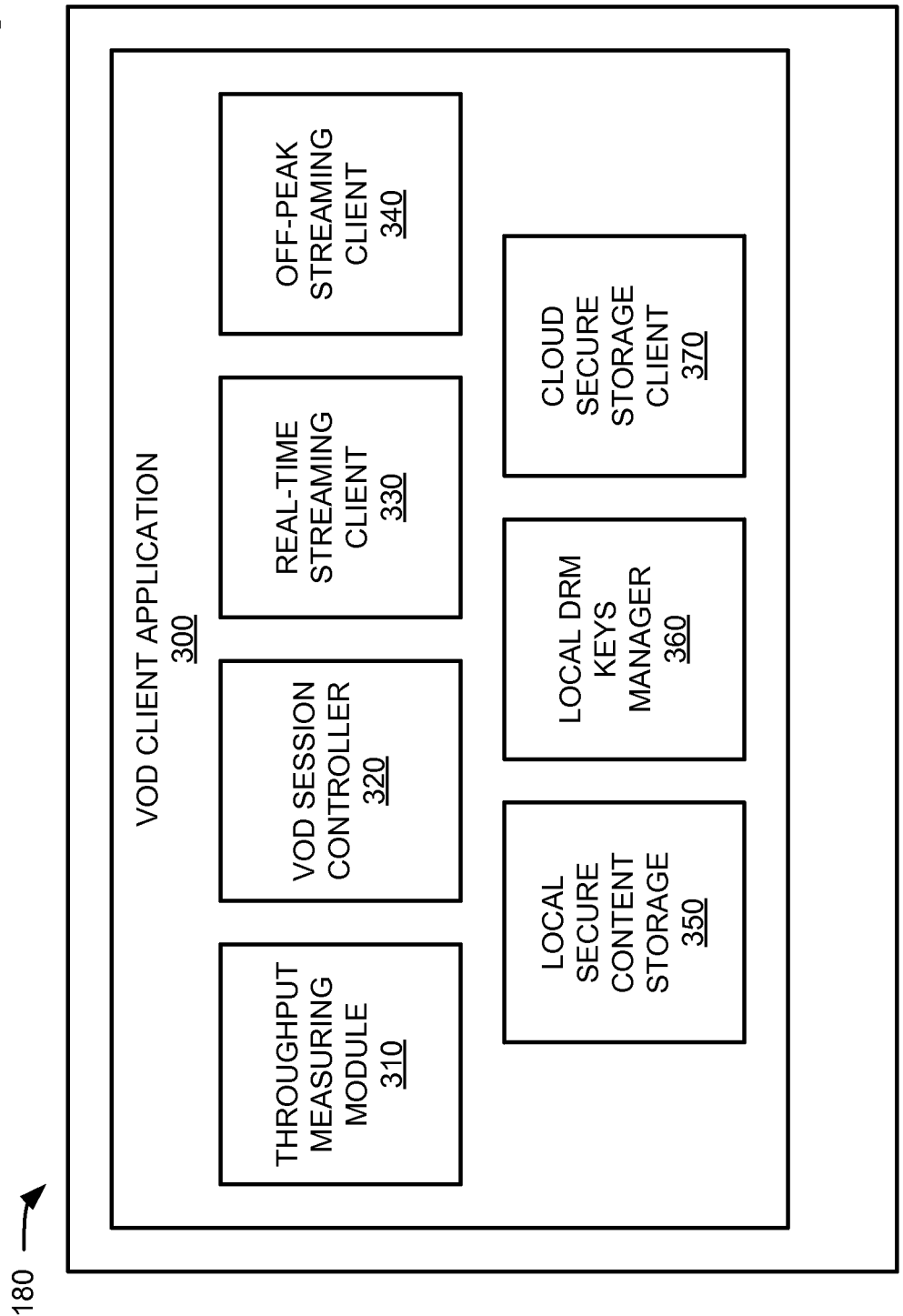
FIG. 3 is a block diagram of exemplary functional components of the user device of FIG. 1.

FIG. 3 is a block diagram of exemplary functional components of user device 180. The functions described in connections with FIG. 3 may be performed by one or more components of device 200 (FIG. 2). As shown in FIG. 3, user device 180 may include a VOD client application 300 that includes a throughput measuring module 310, VOD session controller 320, a real-time streaming client 330, an off-peak streaming client 340, local secure content storage 350, local DRM keys manager 360, and a cloud secure storage client 370.

VOD client application 300 may include hardware and software components. The software components may be downloaded, for example, from application server 150 when user device 180 contacts application server 150 to register for service or to request content from/via content delivery system 130. In other implementations, VOD client application 300 may be provided as part of an operating system or operating system update. VOD client application 300 receive user input to view particular VOD content and may send a request to content delivery system 130 (e.g., a particular streaming server) for a streaming URL. Generally, VOD client application 300 is configured to determine if current network conditions are sufficient to support high quality streaming for the particular VOD content before initiating streaming, recommend delayed VOD viewing when network conditions are not sufficient, and manage a delayed VOD viewing experience when a user agrees to delayed VOD viewing. VOD client application 300 may also acquire licenses for content that are selected by a user for streaming or playing at user device 180.

Throughput measuring module 310 may monitor the network congestion status (e.g., of service provider network 110 and/or access network 170) by measuring current last mile bandwidth available and by retrieving a sample stream from content delivery system 130 to measure the real time end-to-end throughput and other delivery metrics. In one implementation, the sample stream may be from the streaming URL associated with the particular VOD content selected by the user. In another implementation, the sample stream may be from a generic sample. Upon receiving a VOD streaming request from the user (e.g., user 185), throughput measuring module 310 may check current bandwidth and throughput to calculate a current quality of experience (QoE) index value. The QoE index value may be based on, for example, current available bandwidth, streaming requirements for the particular VOD content, current download speeds, network throughput, etc. In another implementation, throughput measuring module 310 may apply a prediction model to calculate a QoE index value prediction for the duration of the particular VOD content requested by the user. For example, if the requested VOD content has length of two hours, throughput measuring module 310 may predict a QoE index for multiple periods over the next two hours.

VOD session controller 320 may evaluate the QoE index value to determine if VOD client application 300 can provide an acceptable viewing experience for the particular VOD content. For example, VOD session controller 320 may compare a current QoE index value with a particular threshold value that indicates that streaming of the VOD content can be supported. Additionally, or alternatively, may apply one or more predictive QoE index values. For example, for a two-hour VOD program, if throughput measuring module 310 predicts that in one hour peak traffic is expected that would drop the QoE index from a currently acceptable value, then the predicted value will become below the threshold value and VOD session controller 320 can define the unacceptable condition for this program viewing.

If the QoE index value from throughput measuring module 310 is below the threshold value, VOD session controller 320 can suggest delaying viewing of the particular VOD content until a time when better quality will be possible. In one implementation, VOD session controller 320 can provide a notification (e.g., a text message, an email, a pop-up message for TV, etc.) for the user when the QoE index is at an acceptable level to support high quality video streaming. In another implementation, VOD session controller 320 may suggest a future time when the QoE index is likely to be at an acceptable level. In still another implementation, VOD session controller 320 may solicit user input to schedule a particular time in the future to view the content selected by the user. As one example, VOD session controller 320 may provide a suggested time window and an incentive (e.g., a discount and/or coupon) to schedule viewing during an off-peak time.

Real-time streaming client 330 may receive content segments and present the content segments as a unified presentation of a selected program. In one implementation, real-time streaming client 330 may decode and play content that is streamed and/or buffered from content delivery system 130. In another implementation, real-time streaming client 330 may decode and play content from local secure content storage 350 and/or cloud storage network 160. Real-time streaming client 330 may output the decoded video to output components (e.g., a display, speakers, etc.) of output device 250 of user device 180. According to implementations described herein, real-time streaming client 330 may cause stored VOD content and stored encryption keys to be deleted (e.g., from local secure content storage 350, memory associated with local DRM keys manager 360, and/or cloud secure storage client 370) after presentation of the selected program or portions thereof, in accordance with a service provider's VOD viewing policy.

Off-peak streaming client 340 may manage streaming and/or downloading of requested content when a user agrees to delayed VOD viewing. Off-peak streaming client 340 may utilize any of plurality of techniques to retrieve a content stream with the highest quality encoding for the delayed VOD viewing. For example, when a scheduled time for the delayed VOD viewing is known, off-peak streaming client 340 may obtain the necessary content during off-peak hours and save it in local secure content storage 350 and/or cloud storage network 160. As another example, when no scheduled delay for VOD viewing is known, off-peak streaming client 340 may obtain the necessary content as network capacity permits and save it in local secure content storage 350 and/or cloud storage network 160. Off-peak streaming client 340 may use one or more mechanisms to obtain the necessary content, such as streaming parts, progressive downloading, streaming only during times of low network utilization, etc. In one implementation, off-peak streaming client 340 may obtain the content in a manner that is transparent to content delivery system 130. Thus, systems and methods described herein may be implemented at a device/client level without changes to existing content delivery networks.

Local secure content storage 350 may include a local buffer of user device 180 for a network stream or download that is being used either for a current presentation of content or for delayed presentation. In different implementations, local secure content storage 350 may be managed by real-time streaming client 330 or off-peak streaming client 340. In one implementation, local secure content storage 350 may store a complete VOD program that was previously selected for delayed VOD viewing. According to implementations described herein, local secure content storage 350 is secure and may allow the use of VOD program exclusively by the particular VOD client application for user device 180, and prevent any copying of the content.

Local DRM keys manager 360 may acquire licenses for content that is selected by a user for delayed VOD streaming or playing at user device 180. In one example, local DRM keys manager 360 may send a request for a license to license server 140. The request may include all or a portion of device registration data (e.g., a registration token obtained from application server 150). If local DRM keys manager 360 receives a license file for the selected content from license server 140, local DRM keys manager 360 may store the license file. In one implementation, local DRM keys manager 360 may include a separately identified secure local storage location of user device 180 to store license files for content that is selected by a user for delayed VOD streaming or playing at user device 180. In another implementation, local DRM keys manager 360 may use secure cloud storage network 160 to store license files for content that is selected by a user for delayed VOD streaming or playing at user device 180. The license file may include a decryption key, for example, to decrypt the selected content in instances where the particular content has been encrypted to avoid unauthorized copying or for other reasons.

Cloud secure storage client 370 may manage buffered streaming content for delayed VOD viewing in cloud storage network 160. For example, cloud secure storage client 370 may direct storage to a user's personal space in cloud storage network 160 when there is insufficient space in local secure content storage 350 to store content for delayed VOD viewing. Cloud secure storage client 370 may track locations (e.g., URLs) for content files and provide location information to real-time streaming client 330 for retrieval.

Although FIG. 3 shows exemplary functional components of user device 180, in other implementations, user device 180 may include fewer components, different components, or additional components than those depicted in FIG. 3. For example, user device 180/VOD client application 300 may include a user profile component to track user viewing history, preferences, and/or account activity. As another example, user device 180/VOD client application 300 may include a separate module to correct or verify buffered segments.

Figure 4:
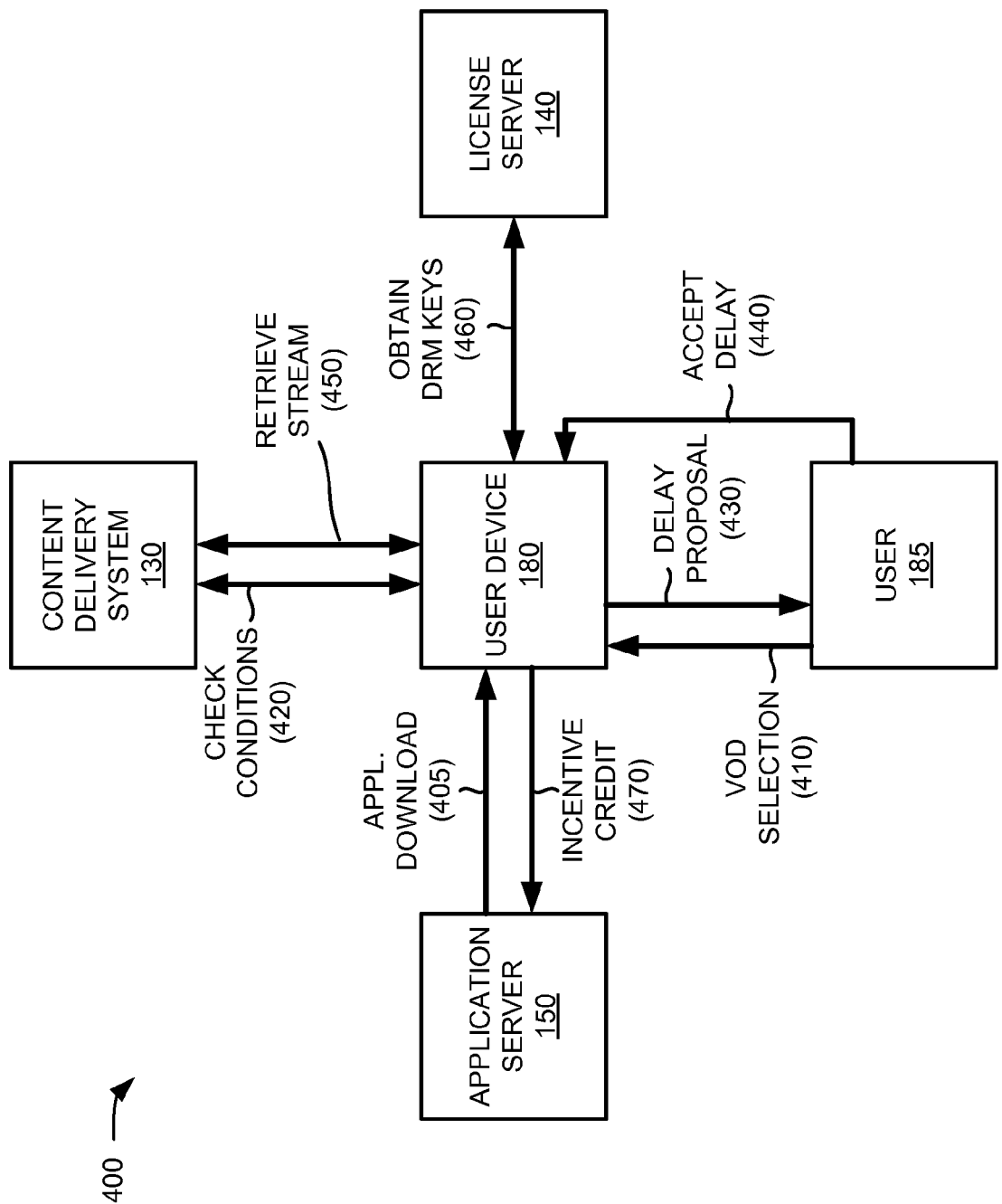
FIG. 4 is a diagram of exemplary communications among devices, servers, and systems in a portion of the network environment of FIG. 1.

FIG. 4 is a diagram of exemplary communications among devices, servers and systems in a portion 400 of network environment 100. Communications in FIG. 4 may represent communications for implementing delayed VOD viewing on user device 180. As shown in FIG. 4, network portion 400 may include content delivery system 130, license server 140, application server 150, and user device 180 in communication with user 185. Content delivery system 130, license server 140, application server 150, and user devices 180 may include features described above in connection with, for example, FIGS. 1-3.

As shown in FIG. 4, user device 180-1 may receive an application download from application server 150. Application download 405 may include, for example, client application 300 and/or other components to enable delayed VOD viewing. In one implementation, application download 405 may be initiated during a registration process of user device 180 with application server 150 to subscribe for services from service provider network 110.

User 185 may use client application 300 to review available VOD titles and provide user input 410 to select particular VOD content to view. For example, a user may provide a remote control, touch-based, or voice-based command to select a program title from a catalog listing. User device 180 may receive VOD selection 410 and, in response, may perform a conditions check 420. Particularly, VOD client application 300 on user device 180 may check current bandwidth and throughput to calculate current QoE index for the particular VOD selection 410. In one implementation, conditions check 420 may include initiating a sample stream of the particular VOD program.

If the current QoE index is below an acceptable level needed to assure high quality streaming, VOD client application 300 will suggest delaying viewing of the VOD program until better quality will be possible. User device 180 may present a delay proposal 430 to user 185 (e.g., on a display screen associated with user device 180). Assuming user 185 agrees to delay viewing of the VOD selection, user 185 may respond with user input 440 to accept the delay. Based on the timeframe (if any) for the delayed VOD viewing, user device 180 may begin to retrieve stream 450 for the selected VOD program immediately or at an off-peak time. For example, if the accept delay user input 440 indicates that the user wants to be notified as soon as the VOD program is available, VOD client application 300 on user device 180 may begin streaming and storing the content. As another example, if accept delay user input 440 indicates that the user intends to view the VOD program at the same time the next day, VOD client application 300 on user device 180 may delay streaming the content until a off-peak time or may schedule a download at a off-peak time. User device 180 may also communicate with license server 140 to obtain DRM keys 460 to enable presentation of the streamed VOD content.

According to one implementation, user device 180 may communicate with application server 150 (or another back-end device) to identify rewards that may be associated with a user's election of delayed VOD viewing. For example, user device 180 may indicate an incentive credit 470 that includes a user account ID, the particular VOD selection, the delay selection, and/or the credit. For example, delay proposal 430 may include a coupon or discount incentive for a user to agree to schedule delayed VOD viewing. The coupon or discount may be determined by representatives of service provider network 110 provided from application server 150 to user device 180 prior to VOD selection 410. Application server 150 may receive incentive credit 470 and may provide to other devices/systems to appropriately credit an account associated with user 185.

Although FIG. 4 shows exemplary communications within network portion 400, in other implementations, network portion 400 may include fewer communications, different communications, and/or additional communications than those depicted in FIG. 4. Alternatively, or additionally, one or more components of network portion 400 may perform one or more other tasks described as being performed by one or more other components of network portion 600.

Figure 5:
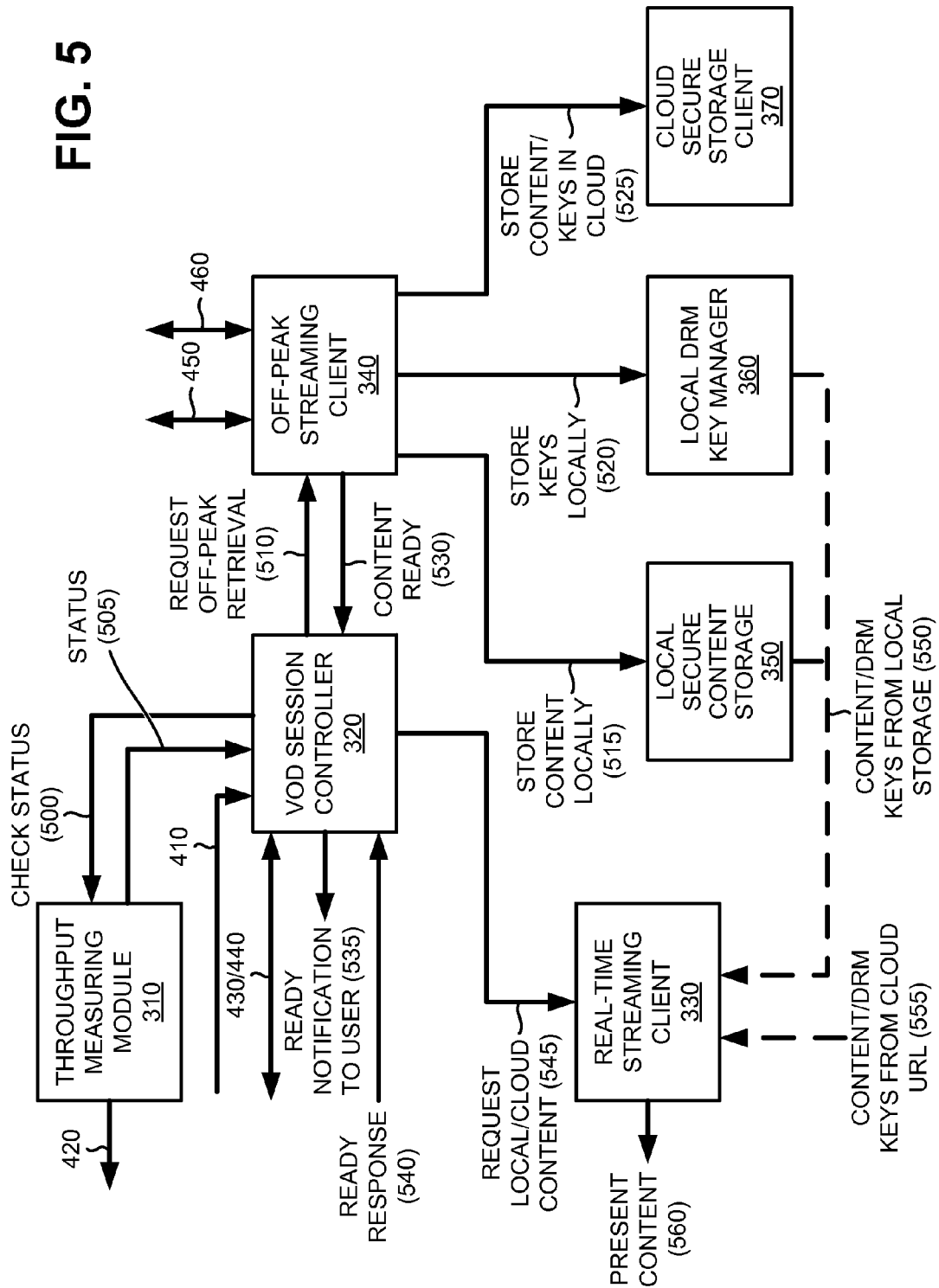
FIG. 5 is a block diagram of exemplary communications among the functional components of the user device of FIG. 1.

FIG. 5 is a diagram of exemplary communications among functional components of user device 180. Particularly, communications depicted in FIG. 5 represent internal communications among functional components of VOD client application 300, described in connection with FIG. 3, in response to the exemplary network communications described above in connection with FIG. 4.

As shown in FIG. 5, VOD session controller 320 may receive VOD selection 410 and initiate a check status command 500 to throughput measuring module 310. In one implementation, check status command 500 may include, for example, a particular URL from which to obtain the selected content. In response to check status command 505, throughput measuring module 310 may check conditions 420 by, for example, retrieving a sample stream from content delivery system 130 and/or performing additional network measurements. Based on the conditions, throughput measuring module 310 may provide a status 505 to VOD session controller 320. Status 505 may indicate a current QoE or another indicator for identifying whether content associated with VOD selection 410 can be provided to user device 180 with high quality streaming.

If status 505 indicates that current network conditions cannot support viewing the VOD selection with high quality, VOD session controller 320 may suggest delayed viewing for VOD selection 410 and may receive user input to accept delayed viewing, as indicated by reference 430/440. In one example, VOD session controller 320 may generate a user interface to solicit delayed viewing, described below in connection with FIG. 6. In response to accepting delayed VOD viewing, VOD session controller 320 may request off-peak retrieval 510 by off-peak streaming client 340. Off-peak streaming client 340 may communicate with content delivery system 130 and/or license server 140 to retrieve content and license keys, as indicated by references 450 and 460.

Off-peak streaming client 340 may use any of several methods to retrieve content associated with VOD selection 410 during off-peak periods. First, off-peak streaming client 340 may determine an off-peak period based on time of day, monitoring current network streaming conditions, additional status feedback from throughput measuring module 310, predictive analysis of network usage, or another technique.

Off-peak streaming client 340 may initiate a streaming session during an off-peak period to retrieve a stream of content associated with VOD selection 410. In one implementation, off-peak streaming client 340 may pause streaming when network conditions indicate congestion. Additionally, or alternatively, off-peak streaming client 340 may use progressive downloads, streaming in parts, or other techniques to obtain content associated with VOD selection 410.

As indicated by reference 515, off-peak streaming client 340 may store content, from content delivery system 130, locally in local secure content storage 350. As indicated by reference 520, off-peak streaming client 340 may store license/encryption keys, from license server 140 in a separate memory location associated with local DRM key manager 360.

Alternatively, or additionally, off-peak streaming client 340 may detect that local secure content storage 350 or local DRM key manager 360 does not have capacity to store content and/or keys associated with VOD selection 410. Thus, as indicated by reference 525, off-peak streaming client 340 may direct cloud secure storage client 370 to store content and/or keys in a user's personal space in cloud storage network 160. In one implementation, cloud secure storage client 370 may indicate a particular storage location (e.g., a directory, file name, and/or URL) for the file or collection of files associated with VOD selection 410.

When all the content and/or keys associated with VOD selection 410 are available for delayed VOD viewing, off-peak streaming client 340 may provide a content ready signal 530 to VOD session controller 320. In response to content ready signal 530, VOD session controller 320 may provide a ready notification 535 to a user (e.g., user 185) that indicates the content associated with VOD selection 410 is available for viewing. In one implementation, ready notification 535 may take the form of a notification on a VOD user interface of user device 180. In another implementation, ready notification 535 may include a separate message, such as a text message, an email, a post to a social media account, etc.

In response to ready notification 535, a user may submit a ready response 540 to VOD session controller 320. Ready response 540 may represent a user's intent to view the available VOD content. Ready response 540 may include, for example, user input to a VOD user interface of user device 180. Based on ready response 540, as indicated by reference 545, VOD session controller 320 may provide a request to real-time streaming client 330 to retrieve the content and/or keys associated with VOD selection 410. In one implementation, as indicated by reference 550, real-time streaming client 330 may retrieve the VOD content from local secure content storage 350 and the encryption/DRM keys from local DRM key manager 360. In another implementation, as indicated by reference 555, real-time streaming client 330 may retrieve the VOD content and/or the encryption/DRM keys from cloud storage network 160 based, for example, on information from cloud secure storage client 370. As shown by reference 560, real-time streaming client 330 may then present the VOD content to the user in a high quality format. In accordance with VOD retention policies, real-time streaming client 330 may automatically delete the stored VOD content and stored encryption keys 550 and/or 555 after presentation of the content, or any portions thereof.

Figure 6:
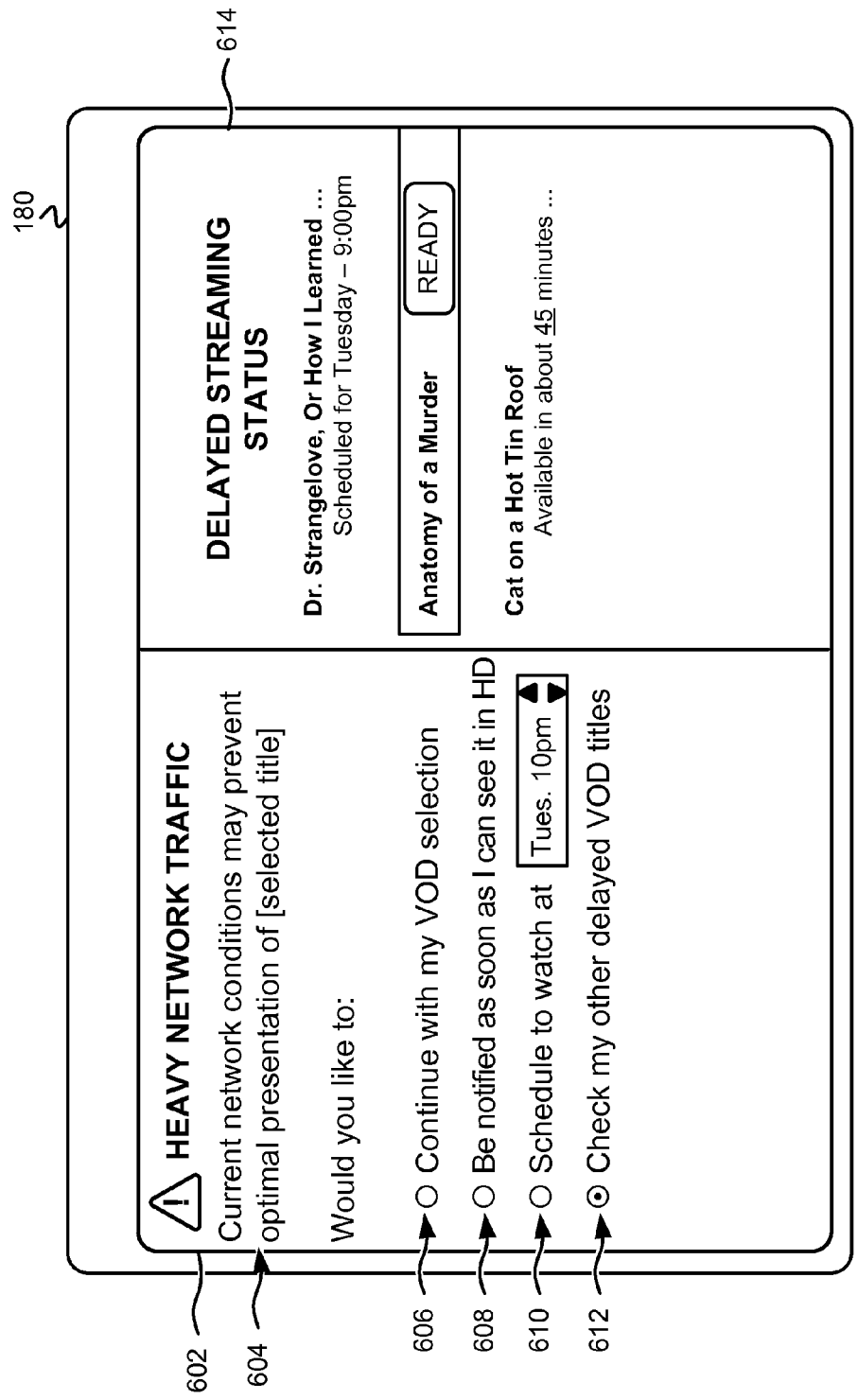
FIG. 6 is a schematic of a user interface that may be presented by the user device of FIG. 1, according to an implementation described herein.

FIG. 6 depicts a diagrams of an exemplary user interface 600, for managing delayed VOD viewing, that is capable of being generated by device 180 (e.g., VOD session controller 320). User interface 600 may include a graphical user interface (GUI) or a non-graphical user interface, such as a text-based interface. User interface 600 may receive user inputs via one or more input devices (e.g., a remote control, a cellular phone, keyboard, touch, etc.) and may be user-configurable (e.g., a user may change the size of the user interfaces; information displayed in the user interfaces; color schemes used by the user interfaces; positions of text, images, icons, windows, etc., in the user interfaces; etc.). The user interfaces may be displayed to a user via one or more output devices (e.g., an integrated display screen, a television connected to an STB, a computer monitor, etc.).

As illustrated in FIG. 6, user interface 600 may include a notification window 602 that provides an indication of a network congestion that could result in a less-than-optimal quality of experience for viewing a particular VOD title. Notification window 602 may be presented, for example, when a user selects a VOD offering for distribution using an over-the-top (OTT) content distribution method and user device 180 (e.g., VOD client application 300) determines that current network conditions would not provide an acceptable QoE index.

Notification window 602 may include an explanation of the current network conditions 604 and a list of options 606-612 for the user. Option 606 (e.g., "Continue with my VOD selection") may cause user device 180 to continue with presenting the current VOD selection, despite the lack of optimal streaming conditions. Option 608 (e.g., "Notify me when I can see it in HD") may cause user device 180 to begin streaming the current VOD selection (e.g., using the off-peak streaming client 340), but without presenting the content to the user until the content can be accessed via a local memory or via cloud storage with a guaranteed bit rate. Option 610 (e.g., "Schedule to watch at . . . ") may cause user device 180 to stream and/or download the current VOD selection at an off-peak time that is prior to a delay time selected by the user. Option 612 (e.g., "Check my other delayed VOD titles") may cause user device 180 to present status window 614.

Status window 614 may include a list of VOD titles that have been previously selected by the user for delayed VOD viewing. For example, status window 614 may indicate if a VOD title has already been scheduled for viewing at a particular time, if a VOD title is ready to be viewed, or if a VOD title is in the process of being stored for later viewing.

Although FIG. 6 depicts an exemplary user interface 600, in other implementations, user interface 600 may depict more, less, different and/or differently-arranged information than depicted in FIG. 6.

Figure 7:
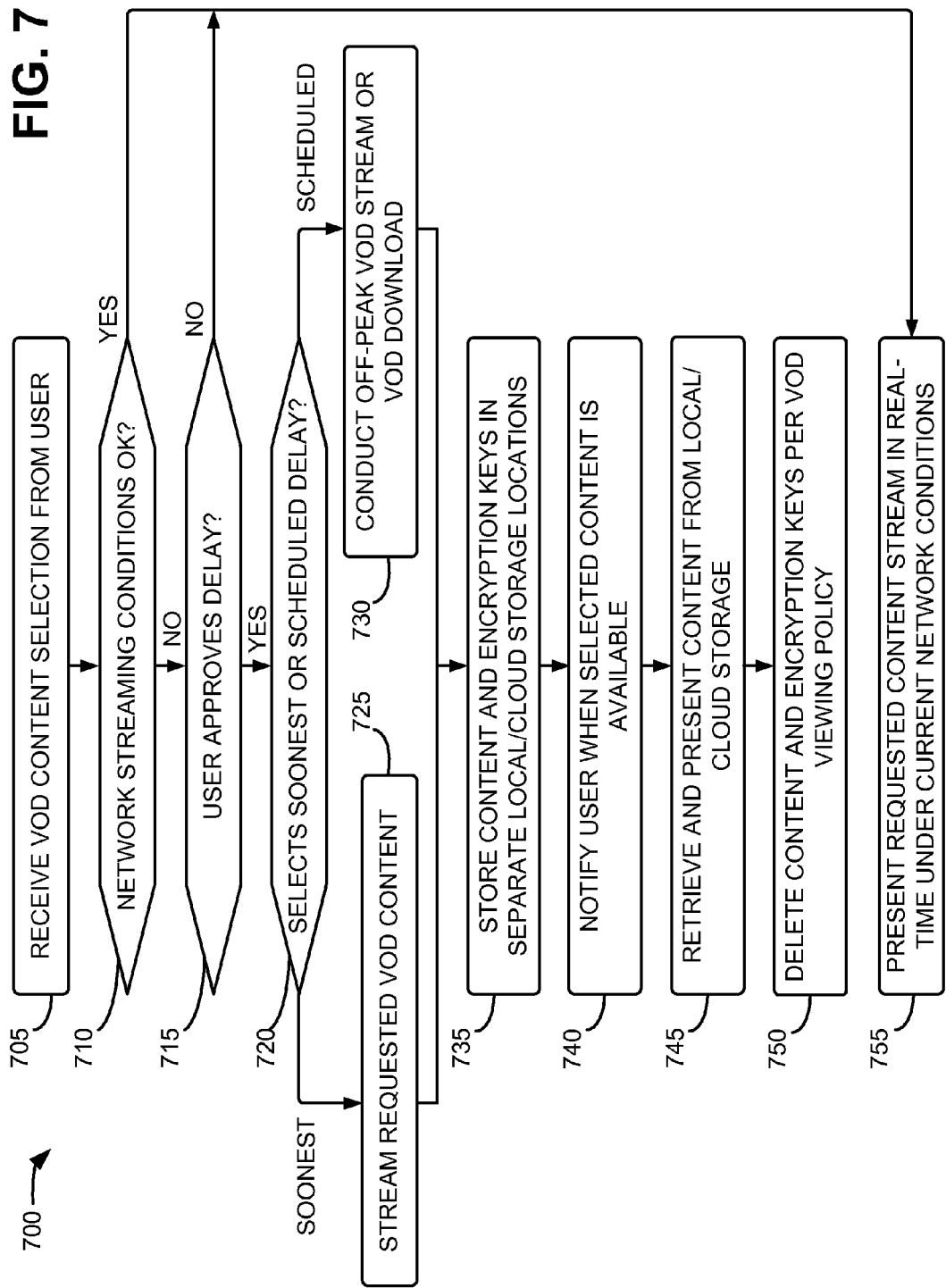
FIG. 7 is a flow diagram of an exemplary process for managing delayed streaming of VOD content, according to an implementation described herein.

FIG. 7 is a flow diagram of an exemplary process 700 for managing delayed streaming of VOD content. In one implementation, process 700 may be performed by user device 180 (e.g., executing VOD client application 300). In another implementation, process 700 may be performed by user device 180 in conjunction with one or more devices from service provider network 110 (including, for example, content distribution system 130, license server 140, or application server 150).

Process 700 may include receiving a content selection (block 705) and determining if network streaming conditions are acceptable (block 710). For example, as described above in connection with FIGS. 4 and 5, user device 180 may receive VOD selection 410 and, in response, may perform a conditions check 420. Particularly, VOD client application 300 on user device 180 may check current bandwidth and throughput to calculate current QoE index for the particular VOD selection 410.

If network streaming conditions are not acceptable (block 710—NO), process 700 may include determining if the user approves a delay (block 710). For example, as described above in connection with FIGS. 4 and 5, user device 180 may present a delay proposal 430 to user 185 (e.g., on a display screen associated with user device 180). In one implementation, user device 180 may cause user interface 600 to be presented to a user. Assuming user 185 agrees to delay viewing of the VOD selection, user 185 may respond with user input 440 to accept the delay.

If the user approves a delay (block 715—YES), process 700 may include identifying whether a user selects a soonest available viewing or a scheduled delay (block 720). For example, as described above in connection with FIG. 6, user device 180 may present option 608 to notify the user as soon as a high quality VOD presentation is available and option 610 to schedule the delayed VOD viewing for a particular time. User input into user interface 600 may include selection of option 608 or option 610.

If the user selected a soonest available viewing (block 720—SOONEST), process 700 may include streaming the requested content under current conditions (block 725). For example, user device 180 (e.g., off-peak streaming client 340) may manage streaming and/or downloading of requested content when a user agrees to delayed VOD viewing. When no scheduled delay for VOD viewing is known, off-peak streaming client 340 may obtain the necessary content as network capacity permits and save it in local secure content storage 350 and/or cloud storage network 160. For example, if the user selects option 608 of user interface 600 (e.g., to notify the user as soon as a high quality VOD presentation is available), user device 180 (off-peak streaming client 340) may receive and decode content that is streamed and/or buffered from content delivery system 130.

If the user selected a scheduled delay (block 720—SCHEDULED), process 700 may include conducting off-peak VOD streaming or VOD downloading (block 730). For example, when a scheduled time for the delayed VOD viewing is known, user device 180 (e.g., off-peak streaming client 340) may obtain the necessary content during off-peak hours and save it in local secure content storage 350 and/or cloud storage network 160. For example, if the user selects option 610 of user interface 600 (e.g., to schedule delayed viewing), user device 180 (off-peak streaming client 340) may receive content that is streamed and/or buffered from content delivery system 130 and start presentation only when all content is received in full.

Process 700 may also include storing the VOD content and encryption keys in separate local and/or cloud storage locations (block 735) and notifying the user when the VOD content is available (block 740). For example, as described above in connection with FIG. 5, user device 180 (e.g., off-peak streaming client 340) may store content, from content delivery system 130, locally in local secure content storage 350; may store license/encryption keys, from license server 140 in a separate memory location associate with local DRM key manager 360; and/or may store content and/or keys in a user's personal space in cloud storage network 160.

Process 700 may also include retrieving and presenting the content from the local and/or cloud storage (block 745) and deleting the stored content and keys (block 750). For example, as described above in connection with FIG. 5, user device (e.g., real-time streaming client 330) may retrieve the VOD content from local secure content storage 350 and the encryption/DRM keys from local DRM key manager 360. In another implementation, real-time streaming client 330 may retrieve the VOD content and/or the encryption/DRM keys from cloud storage network 160 based, for example, on information from cloud secure storage client 370. User device 180 may then present the VOD content to the user in a high quality format. User device 180 may delete all stored content and keys after the user's viewing session is completed per the service provider's VOD viewing policy. For example, if a service provider's VOD viewing policy requires content deletion within 24 hours after viewing, user device 180 may delete the VOD content and/or the encryption/DRM keys 24 hours after the content is presented.

Returning to block 710, if network streaming conditions are acceptable (block 710—YES) or if the user does not approve the delay (block 715—NO), process 700 may include presenting the requested content stream in real-time under current network conditions (block 755). For example, referring to FIG. 5, if status 505 indicates that current network conditions can support viewing the VOD selection with high quality or if delayed viewing is not accepted by the user, VOD session controller 320 may instruct real-time streaming client 330 to simply retrieve the requested content and DRM keys to present the requested content to the user in a typical manner.

According to systems and/or methods described herein, a user device may receive a VOD selection from a user and may determine that current network streaming conditions are not adequate to provide high-quality VOD content. The user device may present an option, to the user, to delay presentation of the VOD content and may receive a selection to delay presentation. Based on the selection to delay, the user device may obtain the VOD content from a content delivery system and may obtain encryption keys for the VOD content from a license server. In a manner transparent to the content delivery system, the user device may store the VOD content and encryption keys to create stored VOD content and stored encryption keys. The user device may notify the user that the VOD content is available to view and may present the stored VOD content using the stored encryption keys. After the presentation, the user device may delete the stored content and stored encryption keys per a VOD viewing policy.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    receiving, by a user device, a video-on-demand (VOD) selection from a user;
    measuring, by the user device, if current or predicted network streaming conditions are adequate to provide streaming of high-quality VOD content associated with the VOD selection;
    when the current or predicted network streaming conditions are adequate, presenting, by the user device, real-time streaming of the VOD content from a content delivery system; and
    when the current or predicted network streaming conditions are not adequate:
        presenting, by the user device, an option to delay presentation of the VOD content;
        receiving, by the user device, selection of the option to delay presentation of the VOD content;
        determining, by the user device, an off-peak period to stream the VOD content;
        obtaining, by the user device, the VOD content via a stream of media segments from the content delivery system;
        obtaining, by the user device, encryption keys for the VOD content from a license server;
        storing, by the user device, the media segments and the encryption keys to create stored VOD content and stored encryption keys, wherein the storing is managed locally by the user device in a manner that is transparent to the content delivery system;
        notifying the user, by the user device, that the VOD content is available to view after the media segments and encryption keys have been stored;
        presenting, by the user device, the stored VOD content using the stored encryption keys; and
        deleting, by the user device and after presenting at least a portion of the stored VOD content, the media segments and stored encryption keys per a VOD viewing policy.

2. The method of claim 1, wherein the option to delay presentation of the VOD content includes an option to delay presentation of the VOD content until a scheduled time.

3. The method of claim 1, wherein the option to delay presentation of the VOD content includes an option to delay presentation of the VOD content until a soonest possible time.

4. The method of claim 1, wherein the VOD content and the encryption keys are stored in separately identified secure local memory locations.

5. The method of claim 1, wherein one or more of the stored VOD content and the stored encryption keys are stored in personal secure cloud storage space associated with the user.

6. The method of claim 1, wherein measuring if current or predicted network streaming conditions are adequate to provide streaming of high-quality VOD content associated with the VOD selection includes:
calculating a quality of experience (QoE) index value based on a current available bandwidth and network throughput, or
calculating one or more QoE index values based on a predicted available bandwidth network throughput.

7. The method of claim 1, further comprising:
receiving, by the user device, a VOD client application to manage the measuring, the presenting the option to delay presentation, the receiving the selection of the option, the storing the media segments and the encryption keys, and the notifying.

8. The method of claim 1, wherein the storing the VOD content and the encryption keys, the notifying the user, and the presenting the stored VOD content is performed locally by the user device.

9. The method of claim 1, wherein the obtaining the VOD content from the content delivery system includes:
identifying an off-peak network usage period, and
streaming the VOD content during the off-peak network usage period.

10. The method of claim 9, wherein identifying an off-peak network usage period includes:
identifying a particular time of day,
monitoring current network streaming conditions, or
applying predictive analysis of network usage.

11. A user device, comprising:
a network interface to communicate with a content delivery system;
a memory for storing video content and instructions to be executed by one or more processors; and
the one or more processors configured to execute the instructions to:
receive a video-on-demand (VOD) selection from a user;
measure whether current network conditions, or predicted network conditions for a duration of the VOD selection, are adequate to provide a highest quality streaming of VOD content associated with the VOD selection;
when the current or predicted network streaming conditions are adequate, present, by the user device, real-time streaming of the VOD content from a content delivery system; and
when the current or predicted network streaming conditions are not adequate:
present an option, to the user, to delay presentation of the VOD content;
receive a selection, from the user, of the option to delay presentation of the VOD content;
determine an off-peak period to stream the VOD content;
obtain the VOD content via a stream of media segments from the content delivery system;
obtain encryption keys for the VOD content from a license server;
securely store the media segments and the encryption keys to create stored VOD content and stored encryption keys, wherein the storing is managed locally in a manner that is transparent to the content delivery system;
notify the user that the VOD content is available to view after the media segments and encryption keys have been stored; and
present the stored VOD content using the stored encryption keys; and
delete the media segments and stored encryption keys per a VOD viewing policy.

12. The device of claim 11, wherein the option to delay presentation of the VOD content includes an indication of one of a coupon, a discount, or a credit if the user schedules delayed VOD viewing, and wherein the one or more processor are further configured to:
send, to a backend device, a record of the selection of the option.

13. The device of claim 11, wherein the option to delay presentation of the VOD content includes one or more of:
an option to delay presentation of the VOD content until a scheduled time, and
an option to delay presentation of the VOD content until a soonest possible time that a high quality presentation can be provided.

14. The device of claim 11, wherein the media segments and the encryption keys are stored in one or more of:
separately identified local memory locations, and
personal cloud storage space associated with the user.

15. The device of claim 11, wherein, when measuring whether current network streaming conditions are adequate, the one or more processors are further configured to:
calculate a quality of experience (QoE) index value based on a current available bandwidth and network throughput, or
calculate a QoE index value based on the predicted network streaming conditions for the duration of the VOD selection.

16. The device of claim 15, wherein the one or more processors are further configured to:
store the media segments and the encryption keys, notify the user, and present the stored VOD content without receiving additional content from the content delivery system.

17. The device of claim 15, wherein, when obtaining the VOD content from the content delivery system, the one or more processors are further configured to:
identify an off-peak network usage period, and
receive the stream of media segments during the off-peak network usage period.

18. A non-transitory computer-readable medium, storing instructions executable by one or more processors, the non-transitory computer-readable medium comprising one or more instructions to:
receive a video-on-demand (VOD) selection from a user;
measure whether current network conditions are adequate to provide a highest quality streaming of VOD content associated with the VOD selection;
when the current network conditions are adequate, present, by the user device, real-time streaming of the VOD content from a content delivery system; and
when the current network conditions are not adequate:

present an option, to the user, to delay presentation of the VOD content;

receive a selection, from the user, of the option to delay presentation of the VOD content;

determine an off-peak period to stream the VOD content;

obtain the VOD content via a stream of media segments from the content delivery system;

obtain encryption keys for the VOD content from a license server;

store the media segments and the encryption keys to create stored VOD content and stored encryption keys, wherein the storing is managed in a manner that is transparent to the content delivery system;

provide notification, to the user, that the VOD content is available to view after the media segments and encryption keys have been stored;

present the stored VOD content using the stored encryption keys; and delete the media segments and stored encryption keys per a VOD viewing policy.

19. The non-transitory computer-readable medium of claim 18, further comprising one or more instructions to:
send, to a backend server, a record of the user's selection of the option.

20. The non-transitory computer-readable medium of claim 18, further comprising one or more instructions to:
receive, in response to the notification, user input to initiate presentation of the stored VOD content.

* * * * *